United States Patent [19]

Winter

[11] Patent Number: 4,922,775
[45] Date of Patent: May 8, 1990

[54] DEVICE FOR CUTTING CONTOURED LABELS

[75] Inventor: Horst Winter, Neutraubling, Fed. Rep. of Germany

[73] Assignee: Krones AG Hermann Kronseder Maschinenfabrik, Neutraubling, Fed. Rep. of Germany

[21] Appl. No.: 188,318

[22] Filed: Apr. 29, 1988

[30] Foreign Application Priority Data

May 2, 1987 [DE] Fed. Rep. of Germany ....... 3714662

[51] Int. Cl.⁵ .......................... B26D 1/16; B26D 1/18
[52] U.S. Cl. ...................................... 83/333; 83/100; 83/107; 83/337; 83/428; 83/500
[58] Field of Search ................. 83/333, 337, 500, 825, 83/428, 27, 426, 490, 171, 100, 349, 156, 102, 103, 105, 107

[56] References Cited

U.S. PATENT DOCUMENTS

| | | | |
|---|---|---|---|
| 204,145 | 5/1878 | Ford et al. ............................. | 83/487 |
| 449,057 | 3/1891 | Perkins .................................. | 83/428 |
| 2,789,199 | 4/1957 | Bjorksten .............................. | 83/171 |
| 3,404,607 | 10/1968 | Feick et al. ....................... | 83/103 X |
| 3,556,909 | 1/1971 | Stegman . | |
| 3,869,997 | 3/1975 | German ........................... | 83/428 X |
| 4,028,167 | 6/1977 | Gerber . | |
| 4,080,856 | 3/1978 | Shearon ............................ | 83/100 X |
| 4,181,555 | 1/1980 | Hoffmann ........................... | 83/98 X |
| 4,188,843 | 2/1980 | Dickey .................................. | 83/304 |
| 4,266,112 | 5/1981 | Niedermeyer .................... | 83/428 X |
| 4,273,014 | 6/1981 | Edling ............................... | 83/428 X |
| 4,452,114 | 6/1984 | Rynik et al. ......................... | 83/100 |
| 4,494,435 | 1/1985 | Lindsay .............................. | 83/349 X |
| 4,549,454 | 10/1985 | Yamashita .............................. | 83/27 |
| 4,561,928 | 12/1985 | Malthouse ........................ | 83/113 X |
| 4,669,644 | 6/1987 | Nilsson ............................. | 83/160 X |

FOREIGN PATENT DOCUMENTS 3423674 11/1985 Fed. Rep. of Germany .
1288495 9/1972 United Kingdom .

Primary Examiner—Frank T. Yost
Assistant Examiner—Rinaldi Rada
Attorney, Agent, or Firm—Fuller, Puerner & Hohenfeldt

[57] ABSTRACT

Apparatus for cutting labels from a ribbon on which the labels are printed. The ribbon is fed into the apparatus along a vertical plane, for instance. There are vertically spaced apart knives adjacent the ribbon for cutting the upper and lower contours of the labels from the ribbon. The knives are caused to pivot toward the ribbon and to rise and fall under the influence of a cam that is shaped correspondingly with the desired contours. After the upper and lower contours are formed the ribbon is caused to change direction around a roller while at the same time the trim margin is deflected in another direction and drawn away. The ribbon, with labels still connected endwise is fed over a vacuum cylinder which has cutters at its periphery for separating the labels from a waste portion between them. The labels are removed from the vacuum cylinder and led to a label applying machine, as an example.

4 Claims, 5 Drawing Sheets

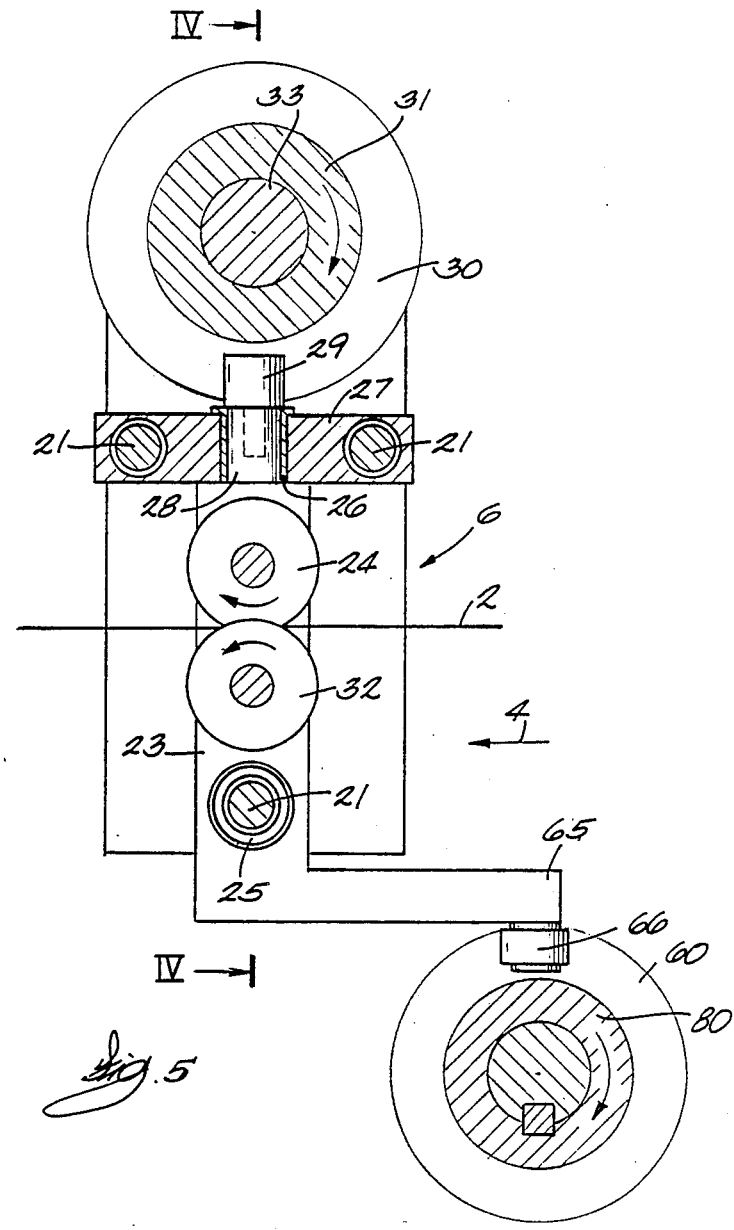

DEVICE FOR CUTTING CONTOURED LABELS

BACKGROUND OF THE INVENTION

The invention disclosed herein relates to a method and device for cutting contoured labels from a continuously moving ribbon of labels.

Although labels stacked in a magazine are used in most container labeling machines, the use of pre-printed label ribbons offers advantages because labels printed on rolls of ribbon are much less costly than precut stacked labels. Furthermore, feeding of the label ribbon to the labeling machine is much simpler and less error prone than when stacked labels are handled.

A method and a device of the type mentioned are well known as demonstrated in German Patent No. DE-OS 29 02 315. In the labeling machine illustrated and described in that patent, a rotating stamping tool is arranged adjacent the path of the label ribbon. The tool rotates such that its peripheral speed corresponds to the linear speed of the ribbon while cutting out contoured labels. The labels are then transferred to a label carrier and from there to the containers onto which the labels are applied. The part of the ribbon that remains after the labels are stamped out passes on the label carrier and is again rolled up.

A disadvantage of this known method and device is that for each label contour or configuration an individual stamping tool is required. The stamping tools wear out frequently so the cost advantage resulting from the use of labels printed on a ribbon is negated by the high cost of stamping tools.

SUMMARY OF THE INVENTION

The invention is an improvement in the method and device of the type previously mentioned so that a wide variety of contoured labels can be cut, rather than being stamped, in a cost effective manner from a label ribbon.

According to the invention, the upper and/or the lower contour of the label are cut simultaneously in successive labels during movement of the label ribbon. This method makes it possible to cut labels having a wide variety of shapes from a ribbon of material without requiring a different stamping or cutting tool for each contour. The service life of the tools can be increased considerably by this method. The label contours can be changed as desired by simply making some adjustments in the apparatus. The continuously progressing cut results solely from movement of the label ribbon. The contour of the label ribbon, that is, the shape of the upper and lower margins of the label results from moving the cutting knives in a predetermined manner perpendicular to the direction of the ribbon of labels.

In a preferred arrangement, the contoured label ribbon is separated into individual labels. This is beneficial because the separation method requires no costly specialized tools, but rather conventional knife blocks or the like can be employed which can be moved across the path of the moving ribbon to produce labels having various upper and lower contours. In addition, the cutting apparatus features an upper and/or lower contoured knife which can be moved perpendicular to the direction of motion of the ribbon for cutting an upper and/or lower label contour and the knife which moves along the ribbon can be constructed so as to separate individual labels from the ribbon.

In the improved label cutting device constituting the present invention, the cutting apparatus is equipped with cutting elements, namely, knives which function independently of each other. While the knife moving along with the label ribbon only separates the labels and is no longer used for stamping the entire contour of the label, the latter results from using a continuously contour cutting knife. Any cutting element suitable for severing the label ribbon may be used. The same is true of the label separation knife which moves along in the direction in which the ribbon moves. The separation knife can be constructed in an advantageous manner as a knife that works with a fixed knife block.

According to a preferred embodiment of the invention, the label cutting installation includes a cam and follower arrangement which controls movement of the contour knives perpendicular to the movement of the ribbon synchronously with the speed of the ribbon. This type of knife control results in formation of the contour of individual labels. The perpendicular movement of the contour knife can be achieved by programmable electronic means in conjunction with stepping motors. Mechanical control can also be used and may be preferable.

In a preferred embodiment, the device for moving the contour knives transversely to the direction in which the ribbon moves includes a cam plate with a cam groove that runs synchronously with and is interconnected with the drive for the label ribbon. If it is necessary to produce labels which have other contours or shapes, the cam plate only has to be replaced by another one but no cutting tool replacement is required.

The perpendicular displacement of the contour forming knives relative to the moving ribbon is accomplished by attaching the contour knives to the end of a rigidly supported dual lever whose other end engages the cam groove of a cam plate. This results in a particularly simple movement of the contour knife which is particularly well suited for cutting plastic strips with hot wires, a laser beam and high pressure jets instead of with shearing tools.

It is particularly advantageous for the knife control device to be constructed such that the contour knife can move not only perpendicular, but also in a tangential manner with respect to the contours which are being cut. This is advantageous if, for example, steel knives are used where a long knife body follows behind the cut. The tangential alignment to the contour guarantees that the knife body always lies in a region which has already been cut.

According to one embodiment of the invention, the cutting installation includes sliding carriages which are adjustable in height, that is, adjustable perpendicular to the direction of movement of the ribbon along the width of the ribbon. The carriages are supported on vertical guides for holding the contour knives. To achieve the tangential alignment of the knife with the label contour it is also advantageous and possible to have the sliding carriages be rotatably supported around a horizontal axis with respect to the vertical guide. Although the sliding carriages can be controlled in respect to their perpendicular movement as well as their swiveling motion by programmable stepping motors, it is preferable that the control apparatus include a cam plate for producing the swivel motion.

The contour knives are particularly wear resistant if they are constructed as disks that are rotatably supported and function together with counterknives or anvils which are also rotatably supported. The result of having the knife disks and counterknives driven rotationally is consistently clean cuts. Moreover, the knife disks are self-sharpening as a result of being driven rotationally.

A further feature of the invention is to have a gear that is adjustable in height on a vertical guide crosswise of the path of motion of the ribbon arranged for the drive of the disk and counterknife. This gear can thus carry out the vertical movements of the sliding carriage. It is preferable to have a drive gear with a broad or wide tooth surface fixed on the shaft which drives the cam plate and meshes with a gear which is movable vertically. The gear which can be moved vertically between different height limits can be displaced along the wide tooth surface of the drive gear and will always remain engaged with this gear.

According to a preferred embodiment of the invention, the knife block is mounted on a vacuum cylinder which applies suction to the contoured labels. The knife block in this way simultaneously performs a transport function in that it transfers the separated labels to the next work station.

It is also particularly advantageous, according to the invention, to have a set of rollers arranged between the contour knives and the knife block whereby one roller is constructed as a guide roller for the contoured label ribbon while the other roller is constructed as a deflection roller for deflecting the cut margin or waste strips. This assures that there is no material blockage of the label machine at any point. If waste label segments remain after separation of the individual contoured labels, they can be blown or vacuumed away. If a plastic ribbon has the labels printed on it and is to be divided into labels, the contour forming knives can advantageously be constructed in the form of hot wires.

The apparatus can also employ a laser whose beams serves as a knife for cutting the contour of the labels from a ribbon. When a laser is used, its beam is directed to swiveling mirrors which reflect and oscillate the beam along one line so the beam spot landing on the ribbon which is moving transversely to the direction in which the beam spot is moving cuts and defines the ribbon contour. This type of mirror scanner formed of swivelable mirrors makes it possible for the laser to be attached to the machine table in a stationary manner, whereby the movements of the laser beam result from swiveling the mirror. Controlling the linear speed of the label ribbon which is to be cut can be done with electronic means instead of mechanical means such as cam and follower arrangements. A water jet cutter can also advantageously be used in place of the knives which cut the contour of the labels. A water jet is particularly suited for label strips which are composed of plastic.

A more detailed description of preferred embodiment of the invention will now be set forth in reference to the drawings.

DESCRIPTION OF THE DRAWINGS

FIG. 5 is a vertical section through the device shown in FIG. 3 taken along the line corresponding to V—V in FIG. 4.

DESCRIPTION OF A PREFERRED EMBODIMENT

Figure 1:
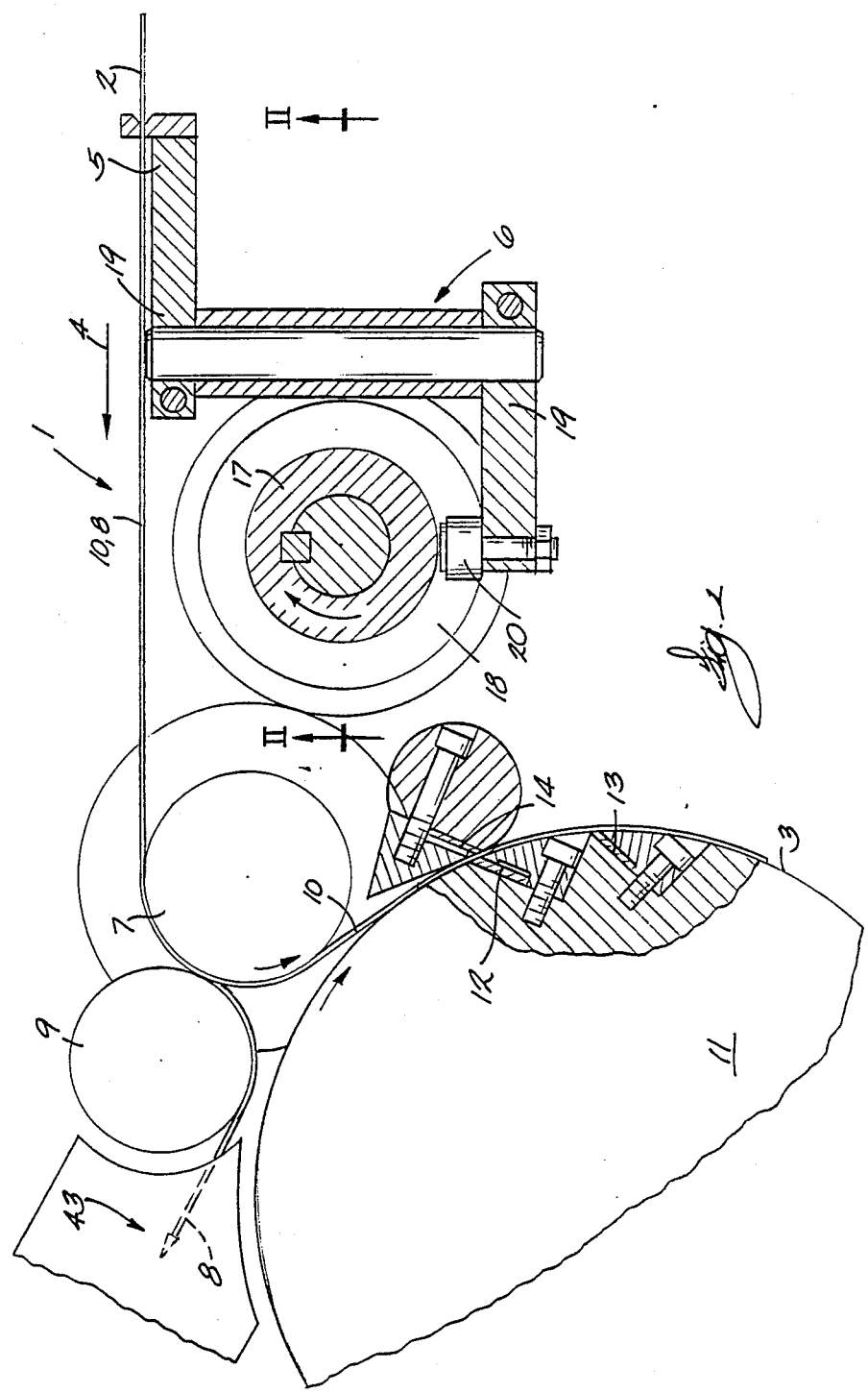
FIG. 1 is a top view, partly in section, of a first embodiment of the new device for cutting labels, the section being taken through the horizontal plane I—I in FIG. 2.

FIG. 1 shows the essential elements of an installation 1, according to the invention, for cutting contoured labels from a continuously moving label ribbon 2 from which the labels 3 are cut out.

The FIG. 1 top view shows that movable knives 5 of the cutting apparatus can move perpendicular to the direction of ribbon movement, indicated by the arrow 4, of the label ribbon 2 since knives 5 are arranged along the path followed by the label ribbon 2. Knives 5 of the cutting apparatus 6, as can be seen more readily in FIG. 2, cut the upper and lower contours of the label ribbon 10 and thereby the labels 3.

The label ribbon 2 makes a turn around a guide roller 7 after which the severed margin strips 8 are removed as they pass along a deflection roller 9. When a label cutting operation is being initialized or set up, the margins for boundary strips 8 are lead around the bottom side of the roller 9 and the leading ends of the strips are started into a vacuum or suction duct 43. From that point on the waste margin strip will be pulled into the duct by suction. The contoured label ribbon 10 is directed from the guide roller 7 onto a vacuum cylinder 11 which at the same time acts as a knife block or anvil for separating the individual labels 3. For this purpose, vacuum cylinder 11 possesses knives 12 and 13 which project outwardly and function together with a fixed knife or anvil 14.

Figure 2:
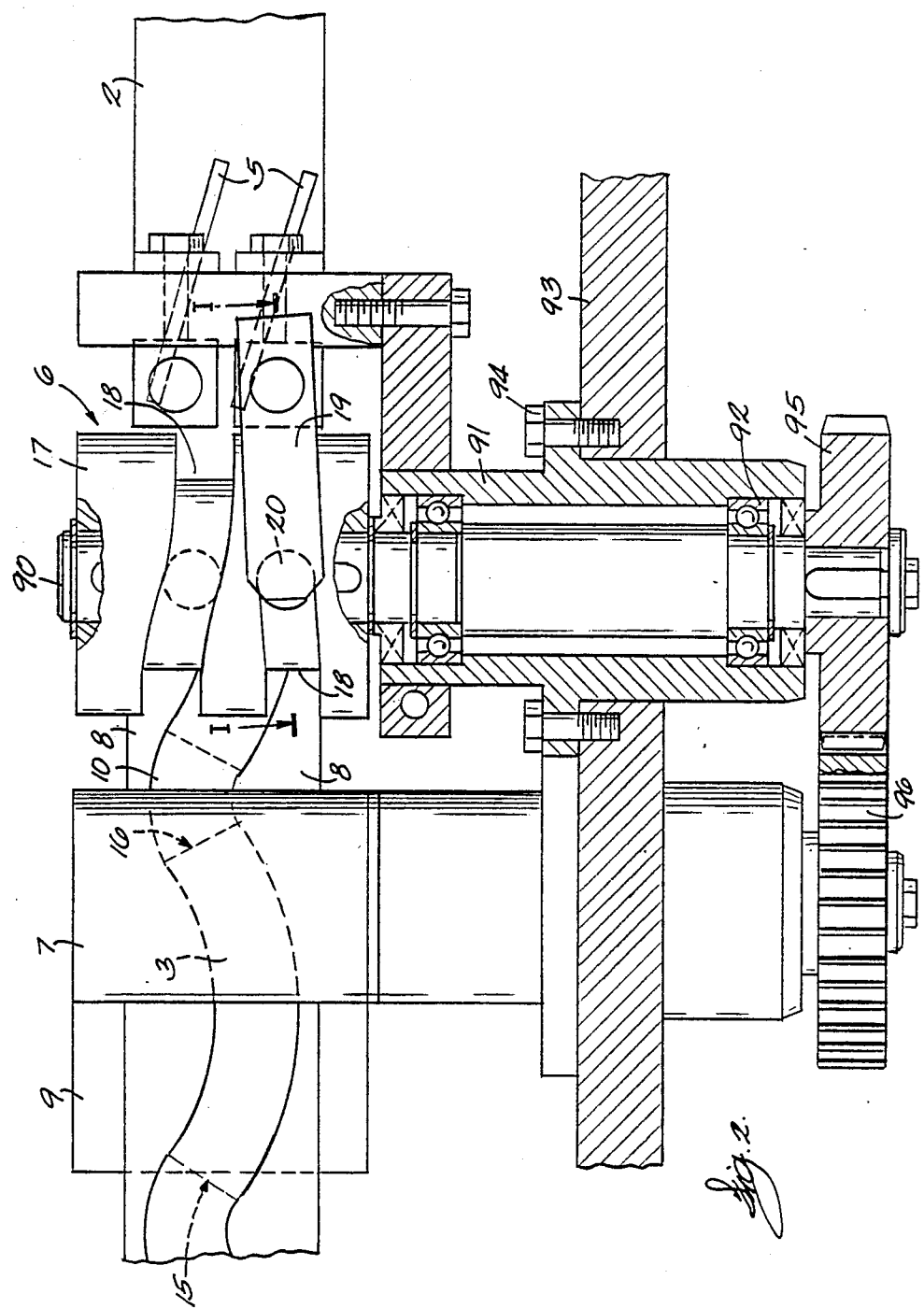
FIG. 2 is a partial vertical section through the device in FIG. 1 taken on the line corresponding to II—II in FIG. 1.

As can be seen particularly well in FIG. 2, the interdependent functioning of the knives 12 and 13 of the rotatable vacuum cylinder 11 with fixed knife block 14 leads to the labels 3 becoming separated from the contoured label ribbon along the cutting lines 15 and 16. The remaining waste segment that occurs between two labels 3 can be removed by the suction device 43. From the vacuum cylinder 11 the successive cut labels 3 are transported to another processing station, not shown.

In FIG. 2 the apparatus 6 for cutting the contours of the label ribbon 2 is illustrated in greater detail. The contour of the label in this example is appropriate for being fit onto the tapered neck of a bottle, for example. The cutting apparatus 6 also includes a control device which controls the perpendicular motion of contour knife 5 in appropriate timing relationship with the speed of the ribbon in which the labels are printed. For this purpose a cam plate 17 having a cam groove 18 is connected by means of a gear train with the drive for the label ribbon 2 in such a way that the cam plate 17 moves synchronously with it. The contour knives 5 are supported on one end of a dual lever 19 which is fixed to the machine and is supported so as to be swivelable. The end of dual lever 19 which lies opposite of the knife features a cam follower roller 20 which engages in cam groove 18 of cam plate 17. In this way, the contour knife 5 is moved vertically across the edgewise traveling ribbon, that is, perpendicular to the direction of movement of the ribbon 2. A narrow, rapidly interchangeable metal blade, a hot wire, not shown, or even a high pressure water jet, not shown, can be used as the contour shaping knife.

The shaft 90 on which the cams 17 are mounted for rotating is journaled in a housing 91 provided with ball bearings such as the one marked 92. Housing 91 is bolted to the machine frame 93 with machine bolts such as the one marked 94. Shaft 90 is driven by power transmitted through a gear 95 which is, in turn, driven from the drive for other parts of the machine, not shown. Gear 95 meshes with another gear 96 which drives rollers 7 and 9.

Figure 3:
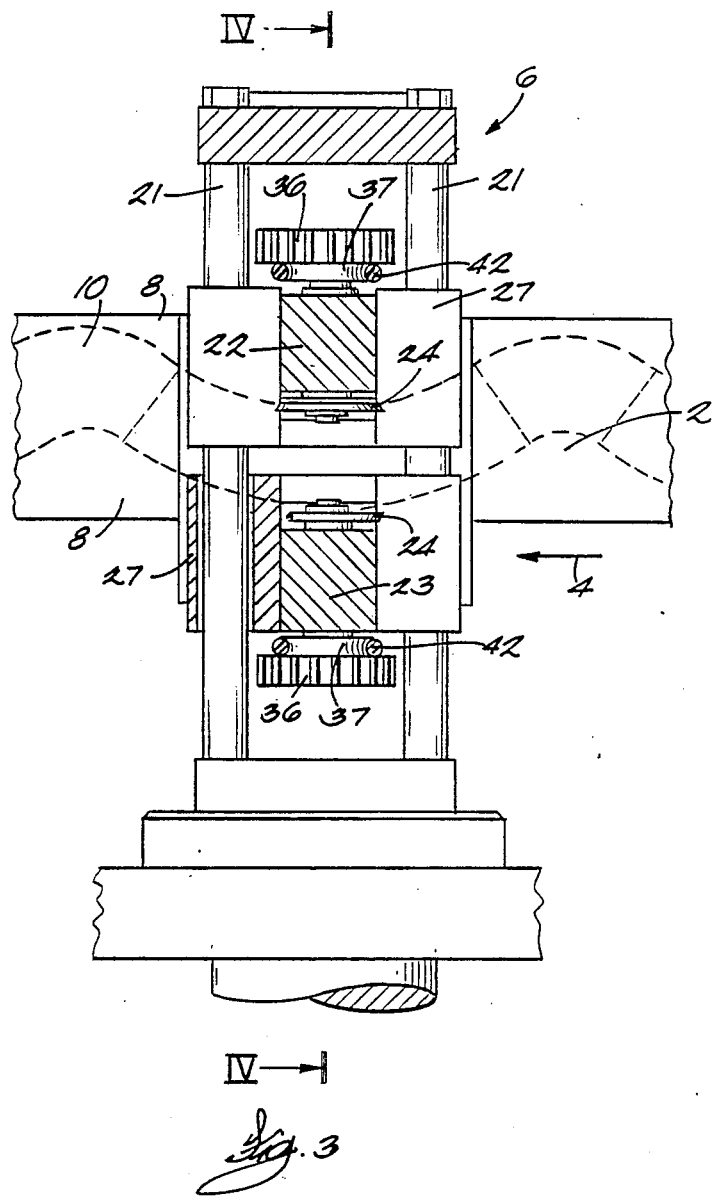
FIG. 3 is a vertical section of a second embodiment of the new cutting device for labels taken on a line corresponding to III—III in FIG. 4.
Figure 4:
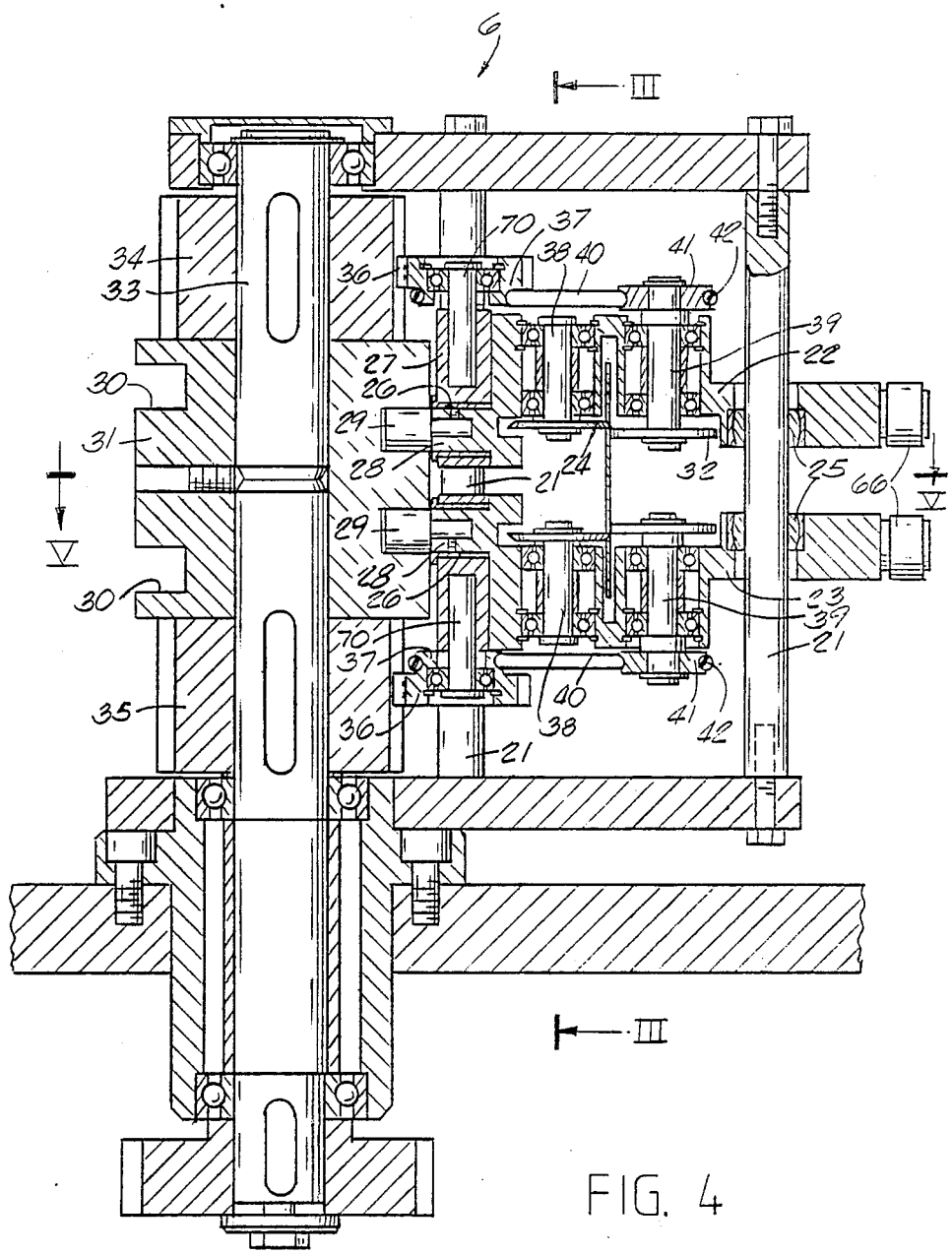
FIG. 4 is a vertical section through the device taken along the line corresponding to IV—IV in FIG. 3.

A second embodiment of the cutting apparatus 6 of the label cutting device 1 is illustrated in FIGS. 3–5. As is particularly evident in FIGS. 3 and 5, the label cutting apparatus 6 includes sliding carriages 22 and 23 which are slidable along vertical guides 21. Movement of the carriages is perpendicular to the direction of movement of the ribbon 2. Carriages 22 and 23 hold the contour knives 24.

The bidirectionally vertically sliding carriages 22 and 23 are supported for swiveling around a horizontal axis with respect to vertical guides 21 for the tangential alignment of the contour knives 24 with the contour of the label. This is especially evident in FIGS. 4 and 5. On the right vertical guide 21 which is illustrated in FIG. 4, sliding carriages 22 and 23 are mounted in pendulous or partly spherical supports 25, which on one hand permit height adjustment with respect to the vertical guide 21 and on the other hand permit a predetermined inclination of the carriages 22 and 23 relative to the three vertical guides 21. On the other side, the sliding carriages 22 and 23 are held in a bushing 26 of a cross member 27 which itself is supported so as to be movable vertically or in height on both vertical guides 21 which are arranged near the cam plate 31. As shown in FIG. 4, upper carriage 2, which is typical, has a cylindrical journal 28 at one end which is journaled in previously mentioned bushing 26. Bushing 26 is fixed in vertically movable cross member 27. Thus, carriage 22 can swivel on the cross member 27, as the member moves up and down, about an axis which is transverse to vertical and coincident with the axis of the cam follower roller 29 which reciprocates carriage member 27 vertically. The journal or shaft 28 extending into the bushing 26 bears a cam follower roller 29 which engages in a cam groove 30 of a cam plate 31 that runs synchronously with the drive for the ribbon and therefore causes a displacement in height as the ribbon moves along as is evident from inspection of FIG. 4 and 5.

A swiveling lever 65 having a cam follower roller 66 is fastened to the ends of swivelable sliding carriages 22 and 23 which face the pendulous support 25, said cam follower roller 66 in turn engaging a cam groove 60 of a cam plate 80 which also runs synchronously with the ribbon drive so that the cam groove 60 causes swinging movement of the sliding carriages 22 and 23 around the swivel axis that extends through the middle of the cam follower 29 and to the point of intersection between the knife disk 24 and counterknife 32. Thus it is guaranteed that the contour knives 24 always move tangential to the contour of the label ribbon which is to be cut. To provide a better overview, the cam plate 80 is not illustrated in FIG. 4 but is illustrated in FIG. 5.

As is particularly evident in FIGS. 4 and 5, the contour knives 24 are rotatable knife disks which function together with rotatable counterknives 32.

The knife disks as well as the counterknives 32 are constructed so they can be driven. For this purpose, gears 34 and 35, having axially long teeth, are fastened to the carrier shaft 33 of the driven cam plate 31. On the cross members 27, on which the sliding carriages 22 and 23 are swivelably supported by means of journals 28, smaller gears 36, whose axes are parallel to the axis of the carrier shaft 33 are journaled on shafts 70 which are fixed on cross members 27. Upper and lower gears 36 are engaged slidably with axially long gears 34 and 35 and can be displaced as a result of the height of cross member 27 being adjustable. Belt pulleys 37 are fastened to the same shaft 70 to which gears 36 are fastened. Shaft 70 is fixed on cross member 27 which can not be swiveled. Similarly, belt pulleys 37 and 41 are fastened on carrier shafts 38 and 39 of the knife disks 24 and the counterknives 32. Belt pulleys 37, and 41 are connected with each other by a round belt 42 so rotation of the cam plate 31 by means of gears 34 driving gears 35 and 36 and round belt 42 causes counterclockwise rotation of knife disk 32 relative to counterknife 24 but at the same time allows for the tangential swivel motion relative to the label contour by means of cam plate 80.

Although the label cutting devices in the illustrated embodiment are moved or controlled with mechanical devices, perpendicular motion and tangential alignment of the contour knives can be achieved with electronic means, not shown, by scanning the speed of the ribbon and actuating with stepping motors, not shown. The advantage of this type of programmable control is that a different label shape can be produced by a simple program change. For label machines which practically always process the same label shape, the described mechanical operations and controls are more cost effective.

Instead of using knife disks or steel knives to define the contours of the labels, hot wires, laser beams and water jets can be used. In these cases, tangential swiveling relative to the cut contour can be eliminated.

In the following, operation of the embodiments is explained further. The label ribbon 2, moving in the direction of the arrow 4, that is from right to left, is first passed through the cutting devices. The cam plate 17 rotates in correlation and synchronism with the speed of ribbon 2 and causes an undulating movement of the contour knife 5 perpendicular to ribbon 2 by means of the dual follower lever that engages cam groove 18. As a result of the perpendicular movement, label ribbon 2 is cut so as to form a contoured label ribbon 10.

Instead of the cutting apparatus 6 illustrated in FIG. 1 and 2, the production of a contoured label ribbon 10 can also be accomplished with the cutting apparatus 6 illustrated in FIGS. 3–5. Here again a perpendicular motion of the knives 24 and 32 results from rotating movement of cam plate 31, which leads to the development of a contoured label ribbon 10. Behind the cutting device 6, three ribbons, namely the contour label ribbon 10 and both margin strips 8 are advanced to the next roller which is a guide roller 7 which is depicted in FIGS. 1 and 2. A deflection roller 9 rolls against the guide roller 7. The deflection roller leads the waste margin strip 8 away. The intermediate continuous label ribbon 10 is led further around the guide roller 7 and passes onto vacuum cylinder 11 which is equipped with knives 12 and 13 on its periphery. As soon as knives 12 and 13 travel past the fixed knife 14 the labels 3 are separated from the contoured label ribbon 10 along the cutting lines 15 and 16. The labels remain adhered to cylinder 11 under the influence of its vacuum while the waste segments that remain between the cutting lines 15 and 16 are removed by a suction or blower unit 43 or the like. The labels 3 produced in this manner are led to other work stations such as to a machine, not shown, for applying the label to bottles.

I claim:

1. Apparatus for use in proximity with a labeling machine for producing individual labels applicable to containers, the labels being printed in uniform periodicity on a ribbon and having opposite longitudinally extending contoured boundaries which are non-linear in the longitudinal direction of the ribbon and which boundaries are spaced apart in a direction transverse to the length of the ribbon and are bounded by waste strips of ribbon, comprising:

means for continuously moving said ribbon in a longitudinal direction in one plane, two levers arranged in proximity to said ribbon and spaced apart in a direction transverse to said longitudinal direction, said levers being mounted for pivoting in parallelism to said one plane about pivot axes, respectively, which are generally perpendicular to said one plane, a knife mounted on each lever on one side of said pivot axes and projecting into said ribbon for one of said knives to cut the ribbon along one of the longitudinally extending contoured boundaries of said labels to produce one contoured edge of the labels and for the other of said knives to cut the ribbon along the other of the longitudinally extending contoured boundaries of said labels to produce another contoured edge of the labels and at the same time producing waste strips of ribbon which formerly bounded the edges of the labels before the contours were cut while the labels remain connected in uniform periodicity on the ribbon, a cam follower mounted to each of said levers on a side of the pivot axis of each of the levers opposite of said one side from which the knives project, cam means having contoured surfaces corresponding to the contours of the labels, said followers being engaged with said contoured surfaces, respectively, said cam means moving in correlation with the speed of ribbon for pivoting said levers to position said knives on the contours of the labels, and additional cutting means to which said ribbon of contoured labels is directed after said contours are cut, said additional cutting means operating to cut said ribbon of contoured labels into individual labels.

2. Apparatus for use in proximity with a labeling machine for producing individual labels applicable to containers, the labels being printed in uniform periodicity on a ribbon and having opposite edges which are non-linear in the longitudinal direction of the ribbon and which edges are spaced apart in a direction transverse to the length of the ribbon and are bounded by waste strips of ribbon comprising:

means for continuously moving said ribbon in a longitudinal direction in one plane, two carriage means and elongated guide members on which said carriage means are movable together transversely to the direction in which said ribbon is moving, cutting mans mounted to each of said carriage means, each cutting means comprising rotatably driven disks having sharp edges and including rotatably driven counter knife disks, said disks cooperating with each other to effect cutting said ribbon along the non-linear edges of the labels, said carriage means and hence the respective cutting means thereon being spaced apart from each other on said carriage means transversely of said longitudinal direction in which the ribbon is moving, means for moving the carriage means in opposite directions transversely to the movement direction of said ribbon on said guide means in correlation with the speed of the ribbon for said two cutting means to cut the ribbon along said non-linear edges of the labels concurrently and produce waste strips of ribbon which formerly bounded the edges of the labels, first cam means having a pair of cam surfaces corresponding to the respective non-linear edges of the labels and cam follower means respectively engaged with said surfaces of said first cam means and with said carriages for moving said carriage means and the cutting means thereon transversely to the movement direction of said ribbon for following the non-linear edges of the labels, means supporting said cutting means on said guide members and said carriage means for swiveling about axes which are perpendicular to said one plane of the ribbon, second cam means having cam surfaces and cam follower means respectively engaged with a said surface of the second cam means and engaged with said carriage means, respectively, for swiveling the carriage means to maintain said cutting means tangential to the non-linear edges of the labels while said cutting means are moving transversely to the movement direction of the ribbon, and additional cutting means to which the resulting ribbon of connected labels is directed after said edges are cut, said additional cutting means operating to cut said ribbon of labels into individual labels.

3. Apparatus according to claim 2 including:

a driven shaft means on which said first cam means is fixed for rotation therewith and driving gear means also fixed to said shaft means for rotation therewith, said driving gear means having axially long teeth, driven gear means mounted for rotation on said carriage means and meshed with said axially long teeth and a shaft fixed on said carriage means and on which the driven gear means is mounted for rotation, said first cam follower means moving said carriage means, said shaft which is fixed on the carriage means and said driven gear means together with the teeth of said driven gear means sliding along said long teeth of said driving gear means, and means coupling said driven gear means to said disks which comprise said cutting means for rotating said disks to effect cutting of the edges of the labels.

4. The apparatus according to claim 3 wherein said means coupling said driven gear means and said disks comprises a flexible belt.

* * * * *